(12) United States Patent
Riesterer et al.

(10) Patent No.: US 7,762,369 B2
(45) Date of Patent: Jul. 27, 2010

(54) AXLE NUT COVER ASSEMBLY

(75) Inventors: Wade Riesterer, Hubertus, WI (US); Matthew Anchor, Milwaukee, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 227 days.

(21) Appl. No.: 12/144,215

(22) Filed: Jun. 23, 2008

(65) Prior Publication Data

US 2009/0314569 A1 Dec. 24, 2009

(51) Int. Cl.
*B62K 25/02* (2006.01)
(52) U.S. Cl. ........................ 180/219; 411/429
(58) Field of Classification Search ............. 180/219; 411/429
See application file for complete search history.

(56) References Cited

U.S. PATENT DOCUMENTS

| | | | |
|---|---|---|---|
| 2,537,072 A | 1/1951 | Lyon | |
| 3,881,391 A | 5/1975 | Dereszynski | |
| 4,041,833 A | 8/1977 | Wagner | |
| 4,944,644 A | 7/1990 | Bell | |
| 4,967,867 A | 11/1990 | Fuller | |
| D339,554 S | 9/1993 | Davidson | |
| D376,568 S | 12/1996 | Davidson et al. | |
| 5,653,564 A | 8/1997 | Nakamura | |
| D407,351 S | 3/1999 | Williams et al. | |
| 5,881,835 A | 3/1999 | Lucht et al. | |
| D412,435 S | 8/1999 | Cultice, Jr. | |
| 5,964,312 A | 10/1999 | Maldonado | |
| 5,992,587 A | 11/1999 | Maldonado | |
| 6,012,889 A | 1/2000 | Robbins et al. | |
| 6,082,479 A | 7/2000 | Storz | |
| 6,105,700 A | 8/2000 | Williams et al. | |
| 7,287,772 B2 | 10/2007 | James | |
| 7,306,358 B2 | 12/2007 | Treat | |
| 7,690,668 B2 * | 4/2010 | Holroyd | ............ 280/285 |
| 2005/0100425 A1 | 5/2005 | Wu | |

* cited by examiner

*Primary Examiner*—Kevin Hurley
(74) *Attorney, Agent, or Firm*—Michael Best & Friedrich LLP

(57) ABSTRACT

An aesthetically pleasing and functional axle nut cover assembly for a motorcycle using minimal threaded fasteners and taking advantage of elastic deformation between multiple portions of a mounting bracket to bias the mounting bracket and a cover member to a motorcycle swingarm to reduce vibration and noise. Separate deformations in the mounting bracket occur during assembly of the mounting bracket to the swingarm and during assembly of the cover member to the mounting bracket. Spring portions of the mounting bracket are maintained in deformed conditions when the axle nut cover assembly is assembled.

15 Claims, 10 Drawing Sheets

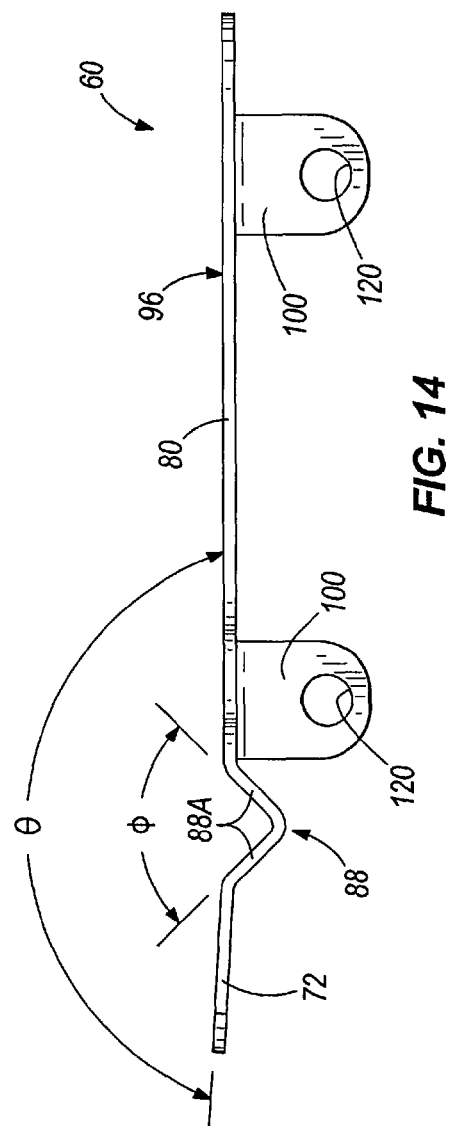
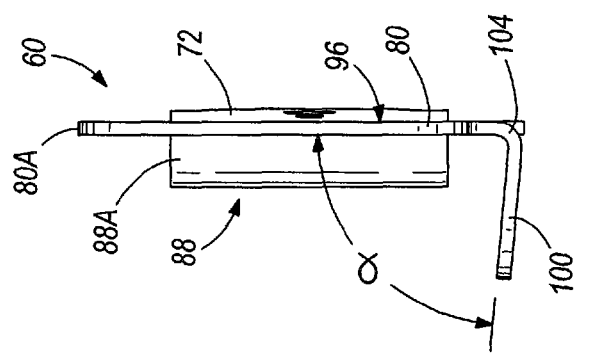
FIG. 14
FIG. 13

AXLE NUT COVER ASSEMBLY

BACKGROUND

The present invention relates to an apparatus and method for covering an axle nut on a motorcycle.

SUMMARY

In one embodiment, the invention provides an axle nut cover assembly for a motorcycle having a swingarm, an axle, and an axle nut coupling the axle to the swingarm. The axle nut cover assembly includes a mounting bracket including a first portion configured to couple to the swingarm, a second portion disposed a distance from the first portion, and a spring portion between the first and second portions. The spring portion has a natural condition defining a first configuration of the first portion relative to the second portion and a deflected condition defining a second configuration of the first portion relative to the second portion, the second configuration being different from the first configuration. The spring portion is configured to be in the deflected condition when the first portion is coupled to the swingarm such that the second portion is biased toward the swingarm. A third portion of the mounting bracket is disposed a distance from the second portion, and a second spring portion is between the second portion and the third portion. The second spring portion has a natural condition defining a first configuration of the third portion relative to the second portion and a deflected condition defining a second configuration of the third portion relative to the second portion. The second configuration of the third portion is different from the first configuration of the third portion. A cover member is coupled to the third portion of the mounting bracket and configured to cover the axle nut. The cover member displaces the third portion relative to the second portion when coupled to the mounting bracket such that the second spring portion is in its deflected condition. The second spring portion is configured to bias the cover member toward the swingarm.

In another embodiment, the invention provides a motorcycle including a frame and a swingarm movably coupled to the frame, the swingarm having an outboard side. An axle couples the rear wheel and the swingarm and defines an axis of rotation of the rear wheel relative to the swingarm. An axle nut is coupled to the axle to restrict movement of the axle relative to the swingarm. An axle nut cover assembly is configured to at least partially conceal the axle nut. The axle nut cover assembly includes a mounting bracket having a first portion coupled to the outboard side of the swingarm, a second portion disposed a distance from the first portion, and a spring portion between the first and second portions. The spring portion has a natural condition defining a first configuration of the first portion relative to the second portion and a deflected condition defining a second configuration of the first portion relative to the second portion. The second configuration is different from the first configuration. The spring portion is biased toward its natural condition. The spring portion is in the deflected condition when the first portion is coupled to the swingarm such that the second portion is biased toward the swingarm. A cover member is coupled to the mounting bracket and covers the axle nut.

In yet another embodiment, the invention provides a method of assembling an axle nut cover assembly to a swingarm for covering an axle nut. A mounting bracket is provided having a bracket-mounting portion and a cover-mounting portion. The bracket-mounting portion is coupled to the swingarm. A cover member is coupled to the cover-mounting portion, deflecting the cover-mounting portion into a deflected condition. The cover member is urged toward the swingarm with the cover-mounting portion.

Other aspects of the invention will become apparent by consideration of the detailed description and accompanying drawings.

BRIEF DESCRIPTION OF THE DRAWINGS

FIG. 13 is a rear view of the mounting bracket of FIG. 11.
FIG. 14 is a top view of the mounting bracket of FIG. 11.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
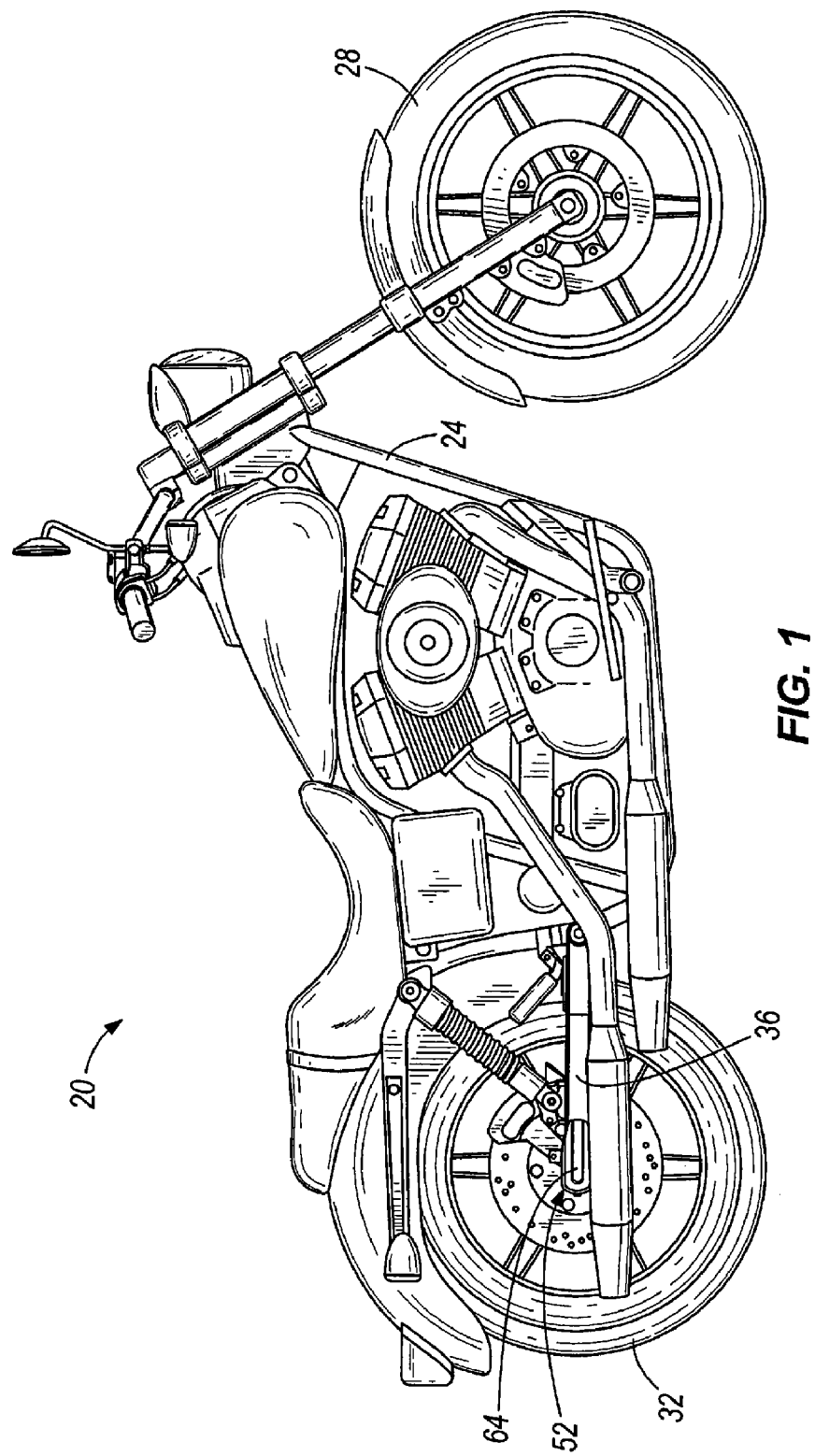
FIG. 1 is a side view of a motorcycle including an axle nut cover assembly.
Figure 2:
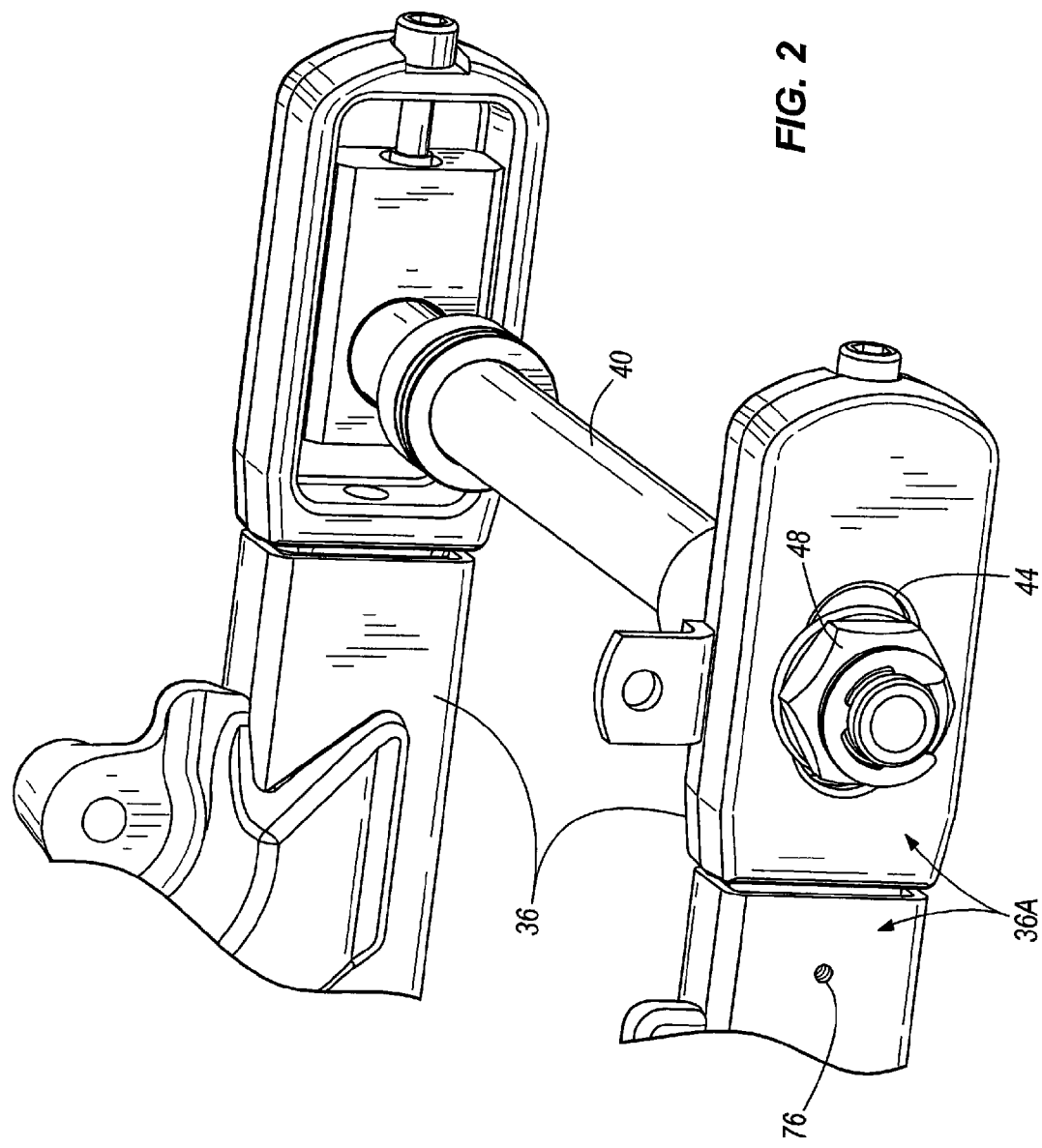
FIG. 2 is a perspective view of a swingarm of the motorcycle of FIG. 1 with the axle nut cover assembly of FIG. 1 removed.

FIG. 1 illustrates a motorcycle 20 including a frame 24, a steerable front wheel 28, and a drivable rear wheel 32. The rear wheel 32 is coupled to the frame 24 with a swingarm 36 and an axle 40. The swingarm 36 and the axle 40 allow the rear wheel 32 to rotate about an axis and also allow the rear wheel 32 to pivot as necessary relative to the frame 24 (e.g., when encountering a bump in the road, etc.). As shown in FIG. 2, the swingarm 36 includes openings 44 through which end portions of the axle 40 extend. The axle 40 is coupled to the swingarm 36 with an axle nut 48 on either end of the axle 40. The axle nuts 48 are disposed generally on the exposed sides 36A of the swingarm 36 facing outwardly away from the rear wheel 32. The openings 44 in the swingarm 36 are extended or slotted in the front-to-rear direction such that the position of the rear wheel 32 relative to the swingarm 36 is adjustable.

One or two axle nut cover assemblies 52 are coupled to the swingarm 36 to cover one or both ends of the axle 40 and the respective axle nuts 48. One axle nut cover assembly 52 is shown on the motorcycle 20 in FIG. 1. An additional axle nut cover assembly 52 (e.g., a mirror image of the illustrated axle nut cover assembly 52) is coupled to the swingarm 36 on the side opposite the illustrated side. Each axle nut cover assembly 52 is configured to substantially conceal the corresponding axle nut 48 in the illustrated embodiment, but the axle nut cover assembly 52 is effective with motorcycles using different types of axles or end hardware coupling an axle to a swingarm for improving the appearance of the axle-to-swingarm connection and protecting the same from contact with the elements. The description below, along with the figures referred to therein, are directed to the illustrated axle nut cover assembly 52 with the understanding that the non-illustrated axle nut cover assembly 52 is substantially identical. As mentioned above, the non-illustrated axle nut cover 52 may be a mirror image of the illustrated axle nut cover assembly 52.

Figure 3:
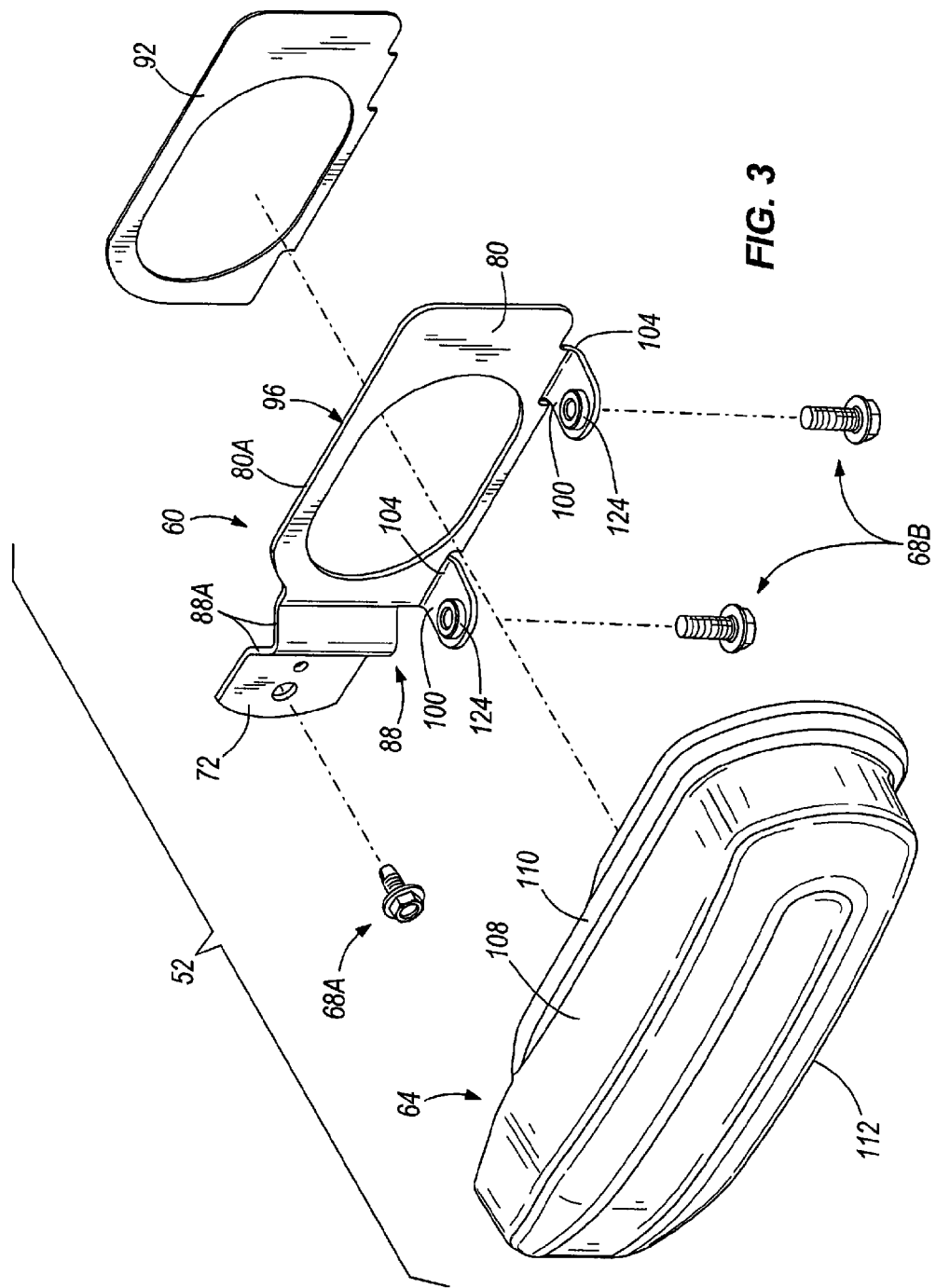
FIG. 3 is an exploded view of the axle nut cover assembly of FIG. 1.
Figure 4:
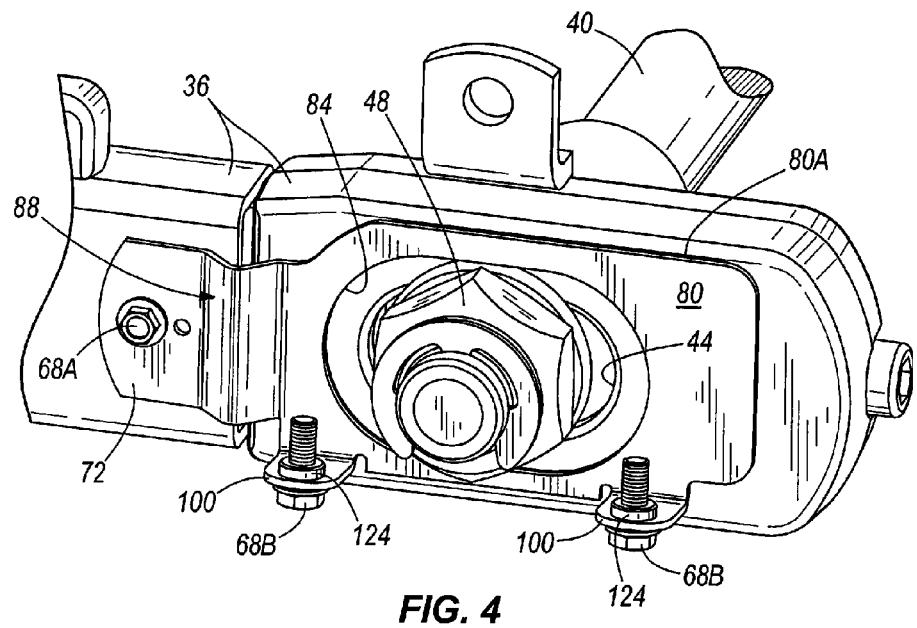
FIG. 4 is a perspective view of a mounting bracket of the axle nut cover assembly coupled to the swingarm of FIG. 2.

As shown in FIG. 3, the axle nut cover assembly 52 includes, among other things, a mounting bracket 60, a cover member 64, and a plurality of fasteners 68. The mounting bracket 60 includes a first portion 72 that is coupled to the swingarm 36 with a first fastener 68A to mount the mounting bracket 60. The first fastener 68A is a thread-forming screw that is threaded into an axle adjustment hole 76 (FIG. 2). A second portion 80 of the mounting bracket 60 is spaced apart from the first portion 72 and includes an opening 84. In the illustrated construction, each of the first and second portions 72, 80 are substantially planar, but are not coplanar with each other when the mounting bracket 60 is formed (FIGS. 11-14). The second portion 80 extends rearward of the first portion 72 toward the free end of the swingarm 36. The opening 84 is sized to allow the axle nut 48 to extend through and be adjusted to various positions relative to the swingarm 36 without moving or adjusting the mounting bracket 60. The second portion is pressed firmly against the exposed side 36A of the swingarm 36, as described in further detail below, without any threaded fasteners between the second portion 80 and the swingarm 36.

Figure 5:
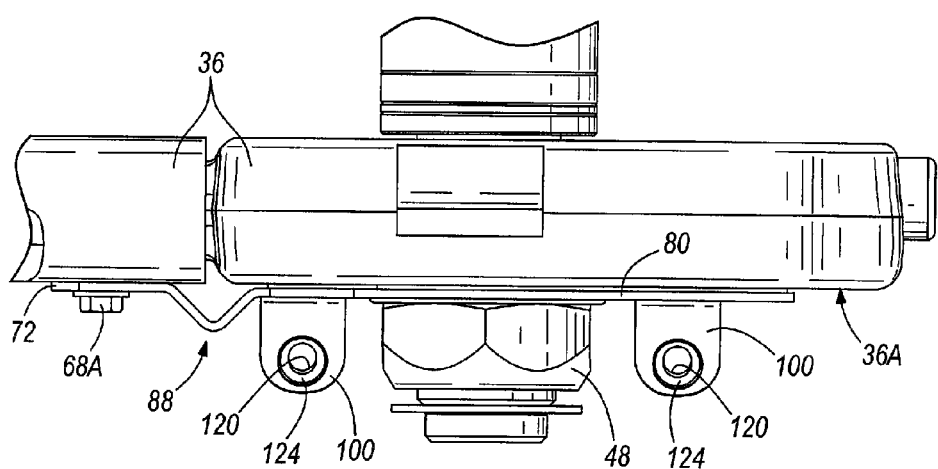
FIG. 5 is a top view of the mounting bracket of FIGS. 3 and 4 coupled to the swingarm of FIG. 2.
Figure 6:
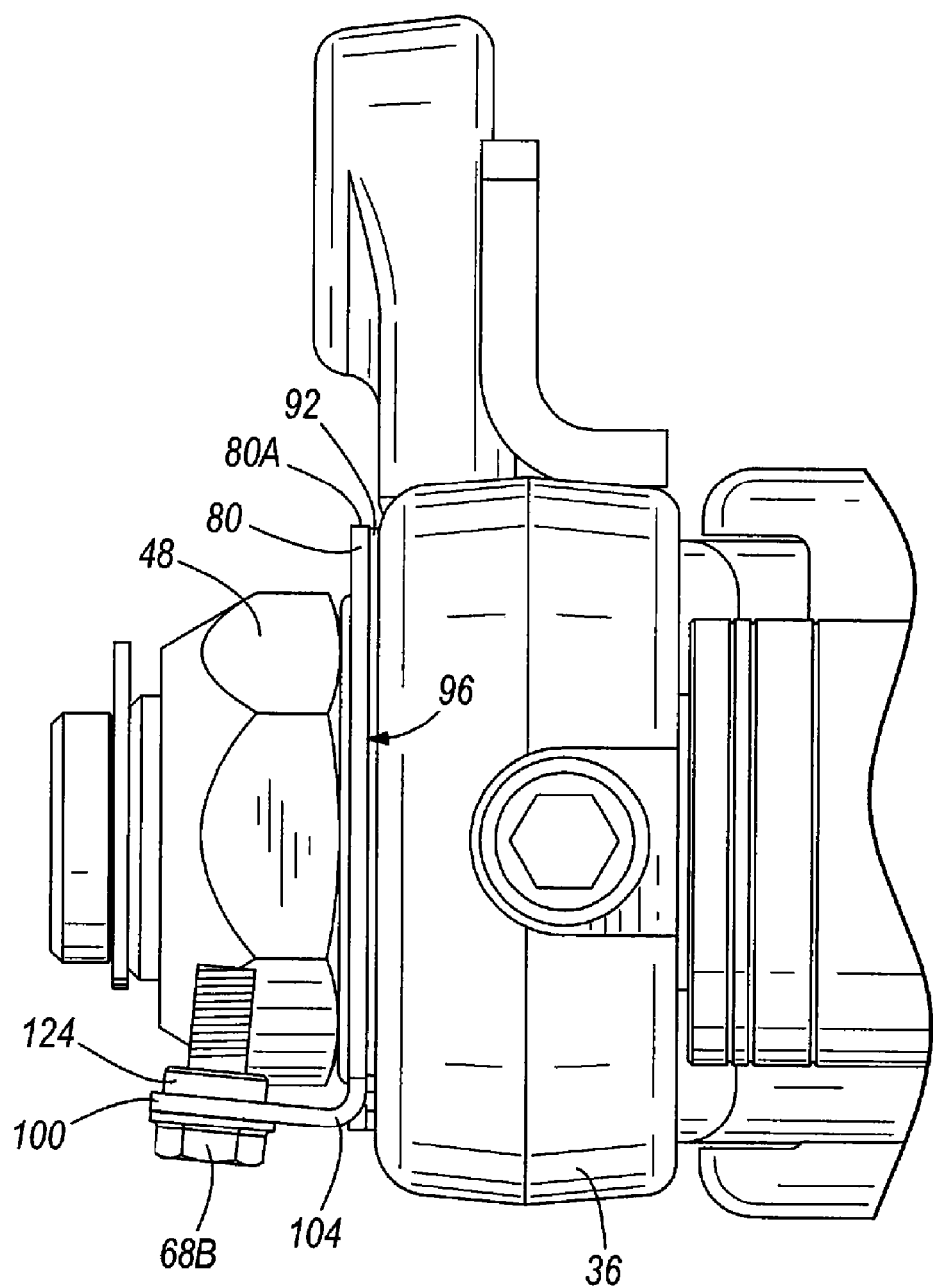
FIG. 6 is a rear view of the mounting bracket of FIGS. 3 and 4 coupled to the swingarm of FIG. 2.
Figure 7:
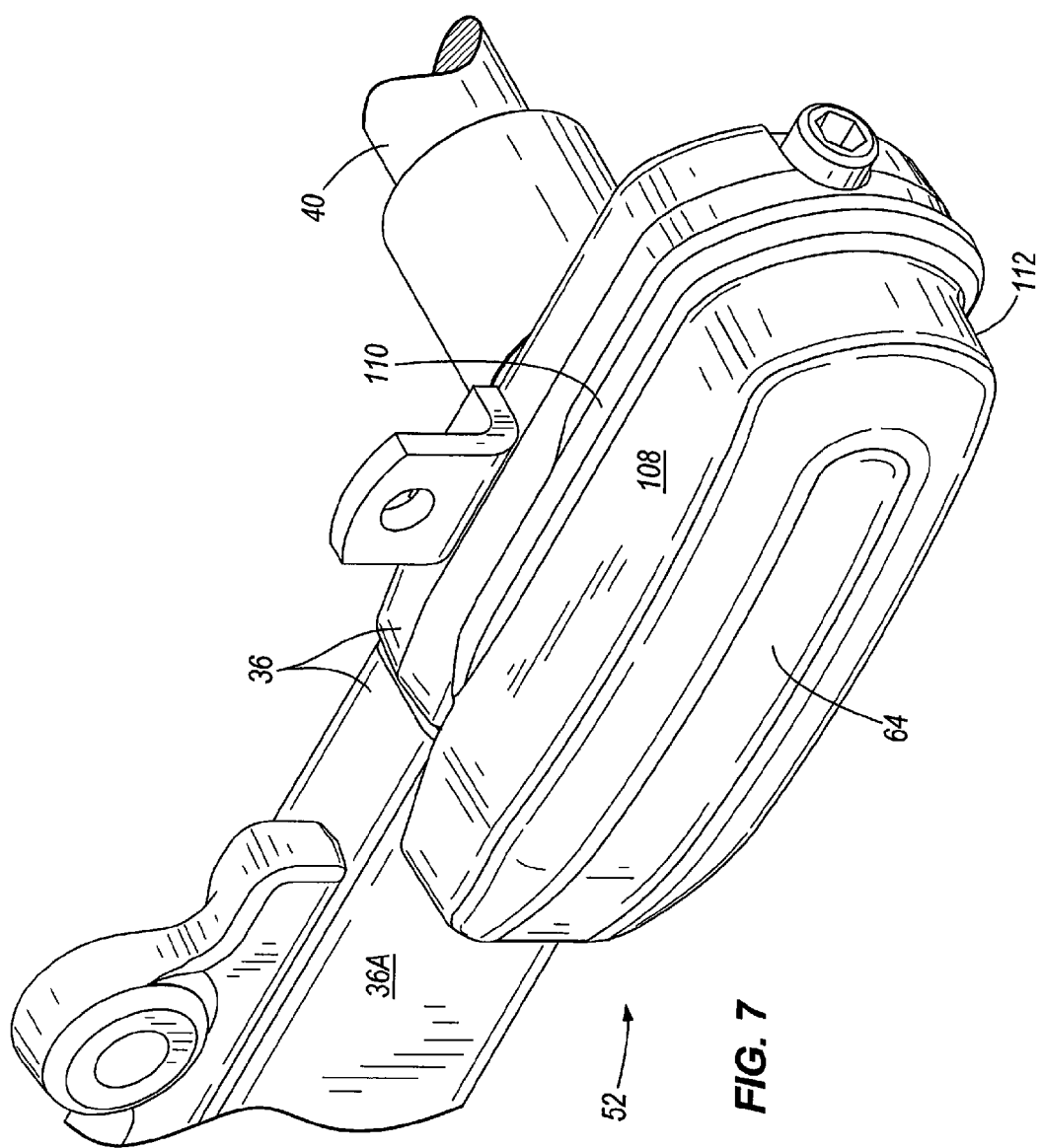
FIG. 7 is a perspective view of the axle nut cover assembly of FIGS. 1 and 3, including a cover member, coupled to the swingarm of FIG. 2.
Figure 8:
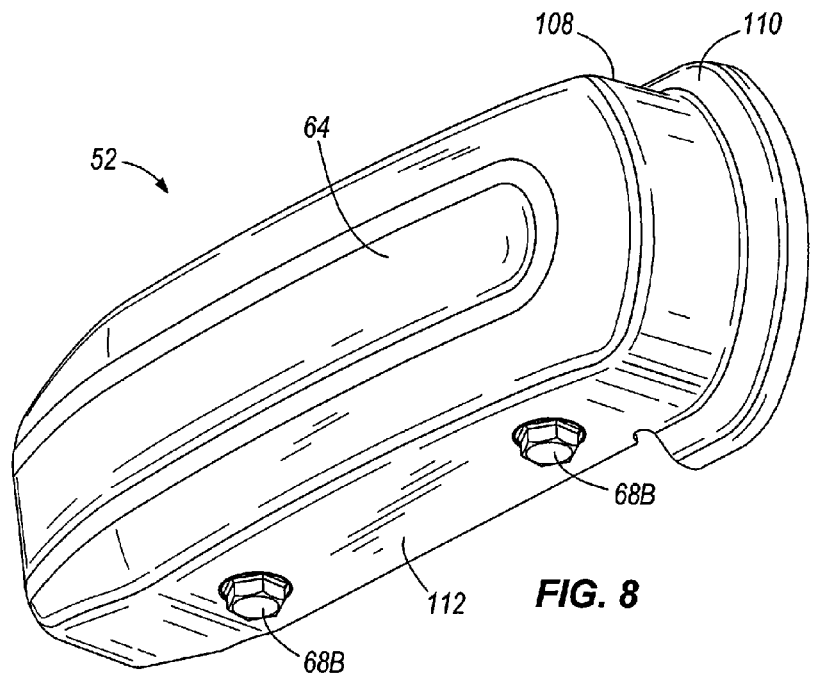
FIG. 8 is a perspective view of the axle nut cover assembly of FIG. 7.
Figure 9:
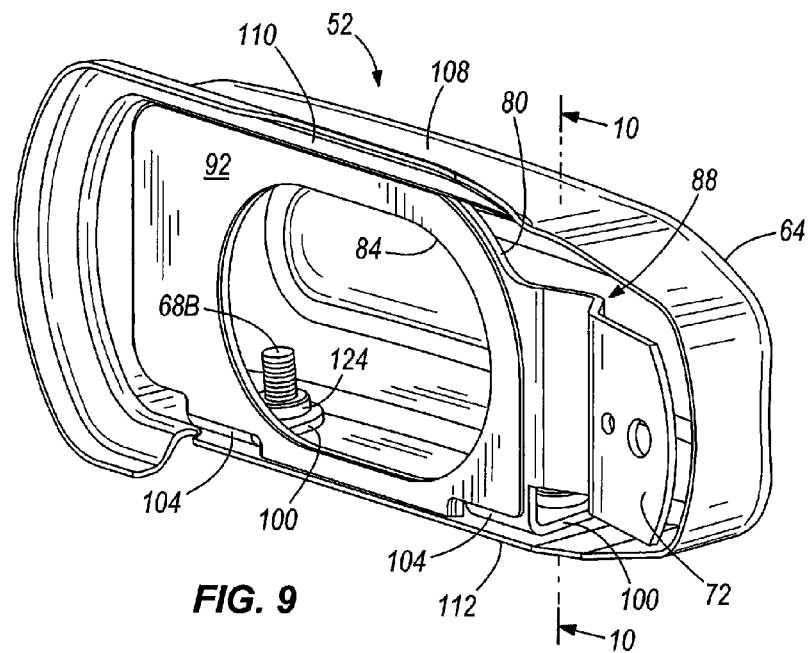
FIG. 9 is an alternate perspective view of the axle nut cover assembly of FIG. 8.
Figure 10:
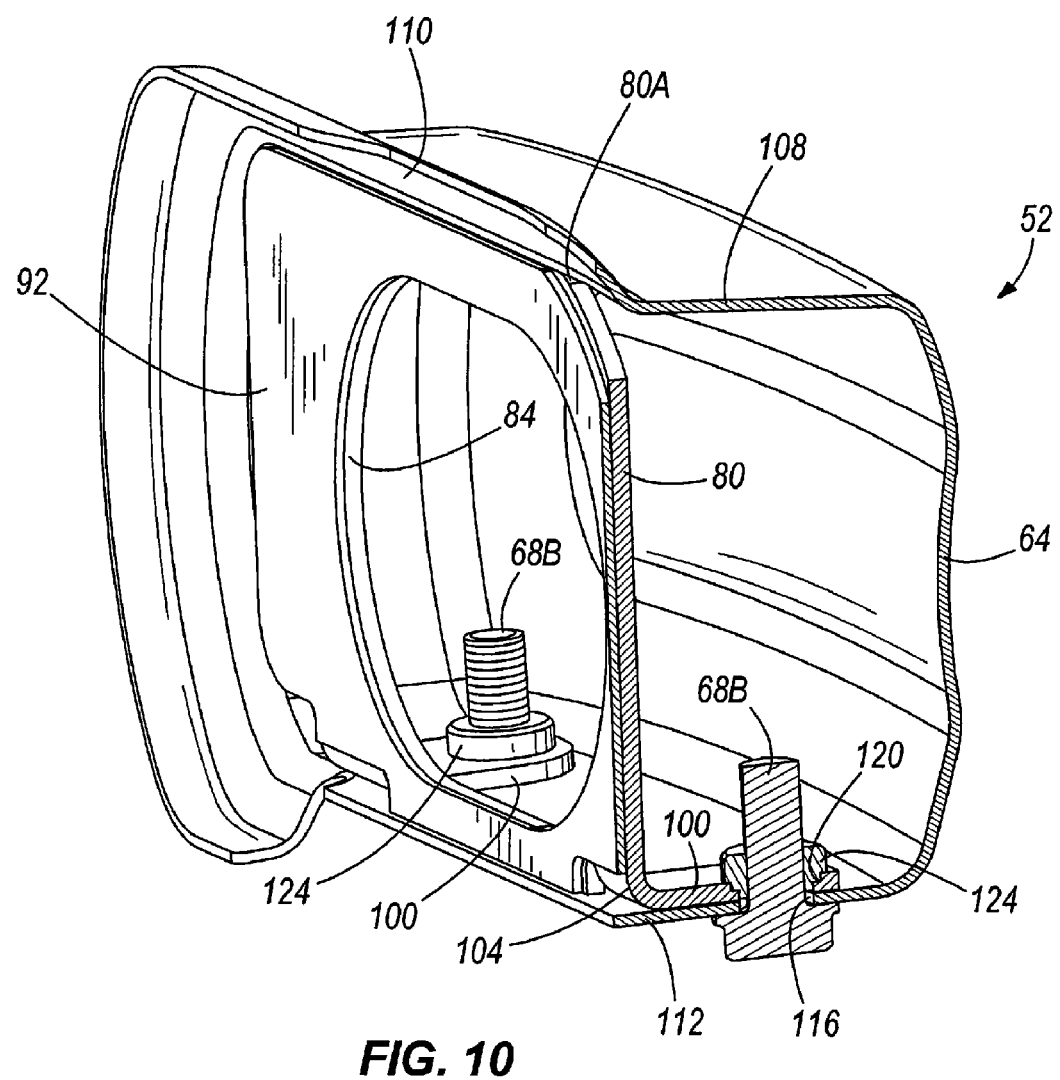
FIG. 10 is a cross-sectional view of the axle nut cover assembly taken along line 10-10 of FIG. 9.
Figure 11:
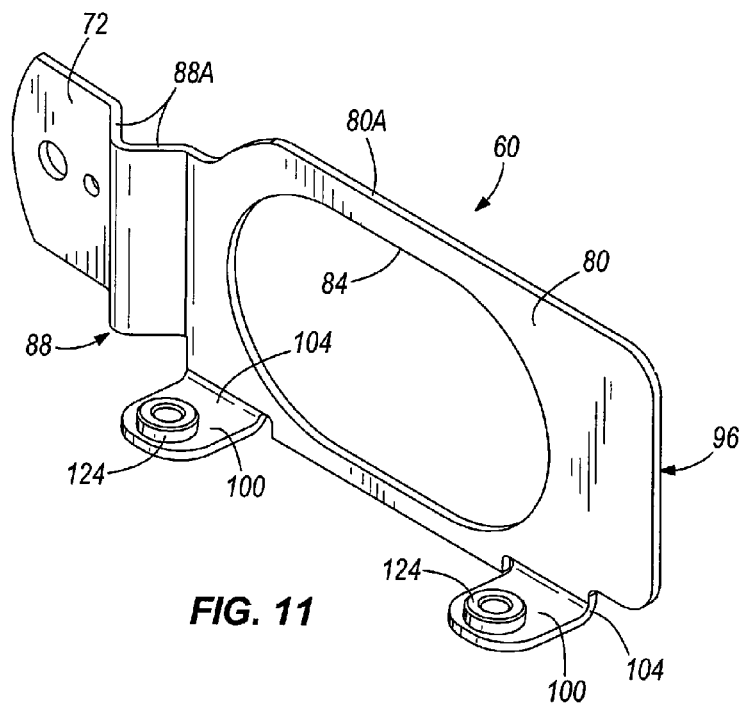
FIG. 11 is a perspective view of the mounting bracket of FIG. 4.
Figure 12:
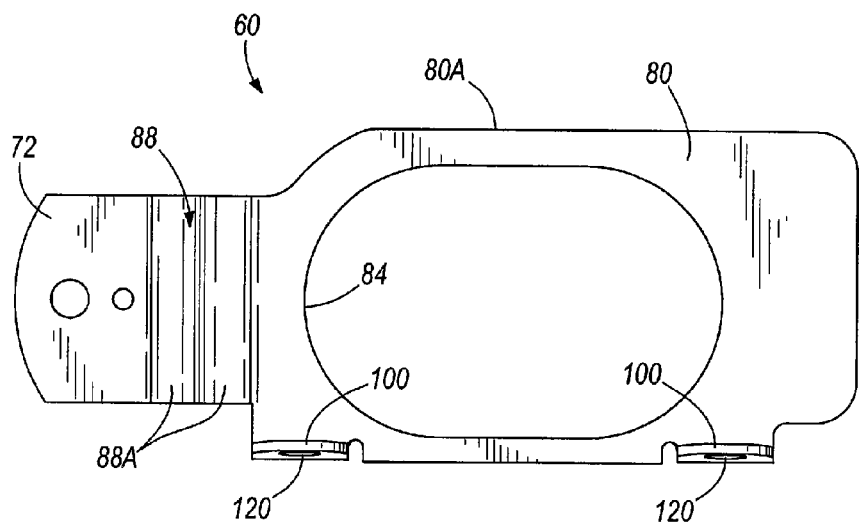
FIG. 12 is a side view of the mounting bracket of FIG. 11.

A spring portion 88 is positioned between the first and second portions 72, 80 of the mounting bracket 60. The spring portion 88 movably couples the first and second portions 72, 80 together. The spring portion 88 includes a pair of legs 88A oriented generally in a V-shape and forming an angle Φ of about 90 degrees therebetween, as shown in FIG. 14, to facilitate elastic bending of the mounting bracket 60 between the first and second portions 72, 80. The spring portion 88 has a natural condition defining a first configuration of the first portion 72 relative to the second portion 80 (FIG. 14). The spring portion 88 further has a deflected condition defining a second configuration of the first portion 72 relative to the second portion 80 (FIG. 5). As shown in FIG. 5, the spring portion 88 is in the deflected condition when the first portion 72 is coupled to the swingarm 36 such that the second portion 80 is biased toward the swingarm 36 by energy stored in the deflected spring portion 88. Thus, the second portion 80 is coupled to the swingarm 36 without a conventional fastener. As shown in FIGS. 9 and 10, a two-sided adhesive strip 92 may be positioned between an inner, swingarm-facing surface 96 (FIG. 14) of the second portion 80 and the exposed side 36A of the swingarm 36. The stored energy in the deflected spring portion 88 compresses the adhesive strip 92 between the second portion 80 and the swingarm 36.

As shown in FIGS. 2 and 5, the exposed side 36A of the swingarm 36 is generally planar in the area in which the mounting bracket 60 resides, and the first and second portions 72, 80 of the mounting bracket 60 assume a generally coplanar orientation when coupled thereto. However, the spring portion 88 is operable to accommodate irregularity in the swingarm 36, such as forward and rearward portions of the exposed side 36A being non-planar. To force the spring portion 88 to assume the deflected condition upon coupling the first portion 72 to the swingarm 36, the second portion 80 is formed to be non-planar with the first portion 72 when the spring portion 88 is in the natural condition. As shown in FIG. 14 with the spring portion 88 in the natural condition, the first and second portions 72, 80 define an interior angle θ of slightly less than 180 degrees. The angle θ is greater than about 170 degrees and less than 180 degrees. The illustrated angle θ is between about 174 degrees and about 177 degrees. By the same principles, the mounting bracket 60 may have a different angle θ between the first and second portions 72, 80 (with the spring portion 88 in the natural condition) if the exposed side 36A of the swingarm 36 is non-planar in the area around the axle nut 48.

The mounting bracket 60 includes a third portion 100, which is spaced a distance from both the first and second portions 72, 80. The cover member 64 is configured to be mounted on the third portion 100 as described below. In the illustrated construction, the third portion 100 includes two coplanar flanges or tabs at a lower end of the mounting bracket 60 that extend from the second portion 80 and away from the swingarm 36. A second spring portion 104 is positioned between the second portion 80 and each of the tabs of the third portion 100. Similar to the first spring portion 88, the second spring portion 100 movably couples the second and third portions 80, 100 together. The second spring portion 104 facilitates elastic bending of the mounting bracket 60 between the second and third portions 80, 100. The second spring portion 104 has a natural condition defining a first configuration of the third portion 100 relative to the second portion 80 (FIGS. 6 and 11-13). The second spring portion 104 further has a deflected condition defining a second configuration of the third portion 100 relative to the second portion 80 (FIGS. 9 and 10).

The second spring portion 104 is in the deflected condition when the mounting bracket 60 is coupled to the swingarm 36 and the cover member 64 is coupled to the third portion 100 such that the cover member 64 is biased toward the swingarm 36 by energy stored in the deflected second spring portion 104. Thus, an upper portion 108 of the cover member 64 is urged securely into contact with the mounting bracket 60 and/or the swingarm 36 without a conventional fastener. Effectively, the cover member 64 is cantilevered from a lower portion 112 thereof. As illustrated in FIGS. 9 and 10, the cover member 64 includes a flange portion 110 that is biased towards an upper edge 80A of the second portion 80 of the mounting bracket 60. The flange portion 110 extends along the upper portion 108 and around the rear end of the cover member 64 to the lower portion 112. Fasteners 68B, such as threaded bolts, extend through openings 116 in the lower portion 112 of the cover member 64 and through openings 120 in the third portion 100 of the mounting bracket 60. Retainers 124, such as threaded nuts, retain the fasteners 68B in position (FIGS. 9 and 10). The fasteners 68B that couple the cover member 64 to the mounting bracket 60 are inserted in an upward direction from below the cover member 64. Therefore, the fasteners 68B are substantially concealed from view by the cover member 64 from normal viewing angles (i.e., from elevations above the axle nut cover assembly 52). The lack of visible fasteners improves the appearance of the axle nut cover assembly 52 and the appearance of the motorcycle 20.

As shown in FIG. 13, the third portion 100 is formed at an angle α with the second portion 80. The angle α is not equal to 90 degrees (the approximate angle between the lower portion 112 of the cover member 64 and the exposed side 36A of the swingarm 36 when the axle nut cover assembly 52 is mounted) in order to force the second spring portion 104 to assume the deflected condition upon coupling the cover member 64 to the mounted mounting bracket 60. As shown in FIG. 13, with the second spring portion 104 in the natural condition, the second and third portions 80, 100 define an interior angle α of slightly less than 90 degrees. The angle α is greater than about 80 degrees and less than 90 degrees. The illustrated angle α is between about 83 degrees and about 85 degrees. By the same principles, the mounting bracket 60 may have a different angle α between the second and third portions 80, 100 (with the second spring portion 104 in the natural condition) depending upon the shapes of and/or interfaces between the exposed side 36A of the swingarm 36, the third portion 100, and the lower portion 112 of the cover member 64.

Thus, the invention provides, among other things, an aesthetically pleasing and functional axle nut cover assembly 52 for a motorcycle 20 using minimal threaded fasteners 68 and taking advantage of elastic deformation between multiple portions 72, 80, 100 of a mounting bracket 60 to promote tight fitting of both the mounting bracket 60 and a cover member 64 to a motorcycle swingarm 36 and to reduce vibration and noise in the axle nut cover assembly 52. Various features and advantages of the invention are set forth in the following claims.

What is claimed is:

1. An axle nut cover assembly for a motorcycle having a swingarm, an axle, and an axle nut coupling the axle to the swingarm, the axle nut cover assembly comprising:
   a mounting bracket including
      a first portion configured to couple to the swingarm,
      a second portion disposed a distance from the first portion,
      a spring portion between the first and second portions, the spring portion having a natural condition defining a first configuration of the first portion relative to the second portion and having a deflected condition defining a second configuration of the first portion relative to the second portion, the second configuration being different from the first configuration, wherein the spring portion is configured to be in the deflected condition when the first portion is coupled to the swingarm such that the second portion is biased toward the swingarm,
      a third portion disposed a distance from the second portion, and
      a second spring portion between the second portion and the third portion, the second spring portion having a natural condition defining a first configuration of the third portion relative to the second portion and having a deflected condition defining a second configuration of the third portion relative to the second portion, the second configuration of the third portion being different from the first configuration of the third portion; and a cover member coupled to the third portion of the mounting bracket and configured to cover the axle nut, the cover member displacing the third portion relative to the second portion when coupled to the mounting bracket such that the second spring portion is in its deflected condition, the second spring portion being configured to bias the cover member toward the swingarm.

2. The axle nut cover assembly of claim 1, wherein the first spring portion includes a substantially V-shaped bend of about 90 degrees.

3. The axle nut cover assembly of claim 1, wherein the third portion includes two tabs spaced a distance apart and each configured to receive a threaded fastener to couple the cover member to the mounting bracket.

4. The axle nut cover assembly of claim 3, wherein the tabs are positioned at a lower end of the mounting bracket, the axle nut cover assembly further comprising two fasteners coupling the cover member to the third portion of the mounting bracket, the two fasteners being inserted through the respective tabs in an upward direction and being substantially concealed by the cover member.

5. The axle nut cover assembly of claim 1, wherein the second and third portions are each substantially planar and are oriented at a variable angle with respect to each other, the angle being more than about 80 degrees and less than about 90 degrees when the second spring portion is in its natural condition.

6. The axle nut cover assembly of claim 5, wherein the angle is between about 83 degrees and about 85 degrees when the second spring portion is in its natural condition, and wherein the angle is about 90 degrees when the second spring portion is in its deflected condition.

7. The axle nut cover assembly of claim 1, further comprising no more than one threaded fastener configured to couple the first portion to the swingarm.

8. The axle nut cover assembly of claim 7, further comprising a two-sided adhesive positioned on a surface of the second portion that is configured to face the swingarm.

9. The axle nut cover assembly of claim 1, wherein the second portion includes a slot configured to receive the axle nut in various positions of adjustment relative to the swingarm.

10. The axle nut cover assembly of claim 1, wherein the first and second portions are each substantially planar and are oriented at a variable angle with respect to each other, the angle being more than about 170 degrees and less than about 180 degrees relative to each other in the first configuration.

11. The axle nut cover assembly of claim 10, wherein the angle is between about 174 degrees and about 177 degrees in the first configuration, and wherein the angle is about 180 degrees in the second configuration.

12. A motorcycle comprising:
   a frame;
   a swingarm movably coupled to the frame, the swingarm having an outboard side;
   a rear wheel;
   an axle coupling the rear wheel and the swingarm and defining an axis of rotation of the rear wheel relative to the swingarm;
   an axle nut coupled to the axle to restrict movement of the axle relative to the swingarm; and
   an axle nut cover assembly configured to at least partially conceal the axle nut, the axle nut cover assembly including
      a mounting bracket having a first portion coupled to the outboard side of the swingarm, a second portion disposed a distance from the first portion, and a spring portion between the first and second portions, the spring portion having a natural condition defining a first configuration of the first portion relative to the second portion and having a deflected condition defining a second configuration of the first portion relative to the second portion, the second configuration being different from the first configuration, wherein the spring portion is biased toward its natural condition, wherein the spring portion is in the deflected condition when the first portion is coupled to the swingarm such that the second portion is biased toward the swingarm, and a cover member coupled to the mounting bracket and covering the axle nut.

13. The motorcycle of claim 12, wherein the mounting bracket further includes a third portion disposed a distance from the second portion, the cover member being coupled to the third portion, and a second spring portion between the second and third portions, the second spring portion having a natural condition defining a first configuration of the third portion relative to the second portion and having a deflected condition defining a second configuration of the third portion relative to the second portion, the second configuration being different from the first configuration, wherein the second spring portion is biased toward its natural condition, wherein the second spring portion is in its deflected condition when the cover member is coupled to the third portion such that the second spring portion biases the cover member toward the outboard side of the swingarm.

14. The motorcycle of claim 13, wherein the second and third portions are each substantially planar and are oriented at a variable angle with respect to each other, the angle being more than about 80 degrees and less than about 90 degrees when the second spring portion is in its natural condition, and wherein the angle is about 90 degrees when the second spring portion is in its deflected condition.

15. The motorcycle of claim 12, wherein the first and second portions are each substantially planar and are oriented at a variable angle with respect to each other, the angle being more than about 170 degrees and less than about 180 degrees relative to each other in the first configuration, and wherein the angle is about 180 degrees in the second configuration.

* * * * *